United States Patent [19]

Rawdon

[11] Patent Number: 4,709,662
[45] Date of Patent: Dec. 1, 1987

[54] FLUIDIZED BED HEAT GENERATOR AND METHOD OF OPERATION

[75] Inventor: Albert H. Rawdon, Shrewsbury, Mass.

[73] Assignee: Riley Stoker Corporation, Worcester, Mass.

[21] Appl. No.: 5,114

[22] Filed: Jan. 20, 1987

[51] Int. Cl.[4] .............................................. F22B 1/02
[52] U.S. Cl. .................................. 122/4 D; 110/245; 165/104.16
[58] Field of Search ............... 122/4 D; 110/245, 216; 431/7, 170; 165/104.16

[56] References Cited

U.S. PATENT DOCUMENTS

| | | | |
|---|---|---|---|
| 4,084,545 | 4/1978 | Nack et al. | 122/4 D |
| 4,103,646 | 8/1978 | Yerushalmi et al. | 122/4 D |
| 4,165,717 | 8/1979 | Reh et al. | 122/4 D |
| 4,473,033 | 9/1984 | Strohmeyer, Jr. | 122/4 D |
| 4,538,549 | 9/1985 | Stromberg | 122/4 D |
| 4,594,967 | 6/1986 | Wolowodiuk | 122/4 D |

Primary Examiner—Edward G. Favors
Attorney, Agent, or Firm—Mason, Kolehmainen, Rathburn & Wyss

[57] ABSTRACT

A fluidized bed heat generator includes a combustion reactor vessel containing a recirculating flow of fluid entrained fine solid particulate material with a dense bed section of limited space in the vessel containing a fluidized coarse solid particulate material retained therein. A recirculating path defined in part within the vessel and externally thereof provides for a recirculating flow of said fine solid particulate material into and out of the combustion vessel and through the coarse material of the dense bed section. Air or gas is supplied for fluidizing the coarse solid particulate material in the dense bed section and for entraining the fine solid material to flow through the dense bed and around the recirculating path. A separator system is provided for maintaining both the fine solid particulate material and the coarse solid particulate material in the dense bed section within selected particle size ranges to promote maximum efficiency of operation at variable loads.

21 Claims, 4 Drawing Figures

IDEAL DISTRIBUTION-SOLID LINES AT FULL LOAD

FLUIDIZED BED HEAT GENERATOR AND METHOD OF OPERATION

BACKGROUND OF THE INVENTION

1. Field of the Invention

The present invention relates to a fluidized bed heat generating system and a method of operation. In particular, the present invention is concerned with maintaining a selected particle size range for recirculating solid fine particulate material which is entrained in gaseous fluid flowing through a combustion reactor vessel which has a fluidized dense bed section at a lower level therein containing a permanent bed of large coarse solid particulate material. Combustion takes place in and above the dense bed and recirculating fine solid particulate materials move through the system absorbing and giving up heat generated in the combustion process.

2. Description of the Prior Art

The present invention is an improvement over fluidized bed systems such as those disclosed in U.S. Pat. Nos. 4,084,545 and 4,154,581 wherein a dense fluidized bed containing relatively coarse solid bed particles is maintained within a combustion vessel wherein entrained fluidized relatively find solid bed particles are recirculated to absorb heat generated in a combustion process taking place within the vessel adjacent the vicinity of the dense fluidized bed section. It has been found that prior art systems of the type disclosed in the aforementioned U.S. patents have had problems because of accumulation, degradation, attrition and agglomeration of the solid particulate materials used in the system.

Accumulation of the fine solid particles sometimes occurs in the dense bed section at times of operation at less than full or design primary airflow and when operating at reduced loads, particles in a size range of approximately 500 microns to 1000 microns have been difficult to entrain and move out of the fluidized dense bed section for recirculation.

Degradation of the dense bed material sometimes occurs as a result of thermal shock upon addition of make up to said dense bed. The results are similar to attrition but occur quickly, forming middling sizes which are ineffective as a grinding media for fuel and ineffective as time delay material for the fine entrained material. These middling sizes may accumulate in the dense bed at low fluidizing velocities or may leave the dense bed at high fluidizing velocities. Degraded or attrited material leaving the top of the dense bed act as a cloud adjacent the region of secondary air admission.

Attrition of the relatively coarse solid particulate materials in the dense bed section occurs and causes particles to be formed in a size range of approximately 1000 microns to 6000 microns and these particles tend to accumulate in the dense bed section. Such particles are too small in size and surface areas to efficiently operate in the dense bed environment.

Agglomeration of and growth of the smaller or fine solid particles in the dense bed section also occurs and this tends to defluidize the dense bed section with a marked increase in the pressure drop across the dense bed.

Another problem with present fluidized bed systems is the relatively poor performance at less than design loads caused because of an increased pressure drop in the dense bed section when the primary airflow is not modulated or reduced to accommodate reduced loads. As a result, part load performance is degraded because of high stack losses and high NOx production, both of which are caused by high excess air at low heat loads.

Because of attrition problems, the dense bed section produces middling size particles which are not large enough in surface area for size reduction of the solid fuel and which cause too high a pressure drop in the dense bed section, thereby resulting in increased power consumption, even at normal design loads.

OBJECT OF THE PRESENT INVENTION

It is an object of the present invention to provide a new and improved fluidized bed heat generating system and method of operating the same.

More particularly, it is an object of the present invention to provide a new and improved fluidized bed system having improved operating characteristics at low or less than design loads.

Yet another object of the present invention is to provide a new and improved fluidized bed heat generator of the character described which eliminates or minimizes the problems associated with accumulation, degradation, attrition and agglomeration of the particles as heretofore noted.

Yet another object of the present invention is to provide a new and improved fluidized bed heat generator wherein discrete particle size ranges are selected and maintained for the recirculating fine solid particulate materials entrained in fluidized flow and for the larger size or coarse bed particles permanently maintained in the dense bed section.

It is another object of the present invention to provide a new and improved fluidized bed heat generator and method wherein the system is capable of handling modulating loads at relatively high efficiencies in comparison to prior art systems.

BRIEF SUMMARY OF THE INVENTION

The foregoing and other objects and advantages of the present invention are accomplished in a new and improved fluidized bed heat generator and method of operation wherein a combustion reactor vessel is provided for containing a recirculating flow of fluid entrained, fine solid particulate material and a dense bed section of limited space is provided in the vessel containing a fluidized coarse solid particulate material which is retained in the dense bed section.

The system includes a recirculating path for the fine solid particulate material both internally and externally of the combustion vessel to flow through the coarse material of the dense bed section. The solid particulate material is continuously maintained in a fluidized state and the fine solid particulate portion of material is entrained to flow through the dense bed section and around a recirculating path.

A separation system is provided for maintaining the fine solid particles in a desired size range and for maintaining the coarse solid particles in a desired size range in order to promote maximum heat transfer efficiency and to minimize the problems of degradation, attrition and agglomeration heretofore mentioned.

In accordance with the method of the present invention, an entrained fluidized bed is formed in a combustion vessel containing a first relatively fine solid bed particle component and having a more limited region partially within the vessel wherein a dense fluidized bed is provided for containing a second relatively coarse solid bed particle component in a permanent dense bed section. The entrained first particle component is recirculated to and from the vessel and flows through the dense fluidized bed section in the more limited space region. Solid particles ranging in size between the selected fine and coarse particle size ranges are removed as are particles that agglomerage and grow to sizes larger than desired in the dense fluidized bed section. This arrangement permits the modulation of the fluid velocity in the system while still providing high efficiency combustion and other reactions without the characteristic problems of high energy losses and high NOx formation as mentioned heretofore.

BRIEF DESCRIPTION OF THE DRAWINGS

For a better understanding of the present invention, reference should be had to the following detailed description taken in conjunction with the drawings, in which.

DETAILED DESCRIPTION OF PREFERRED EMBODIMENTS

Figure 1:
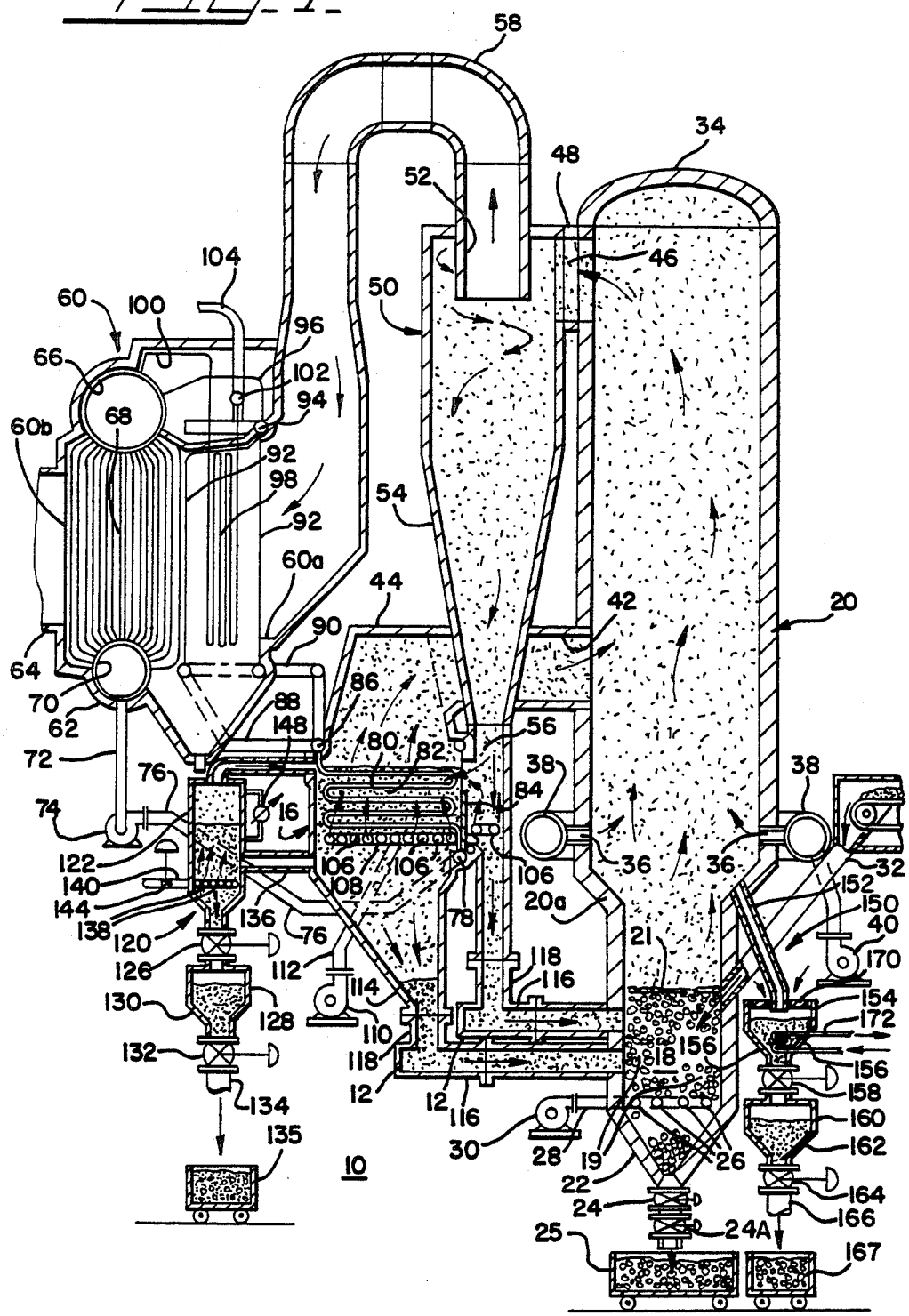
FIG. 1 is a vertical cross-sectional view of a new and improved fluidized bed heat generator in accordance with the features of the present invention.

Referring now more particularly to the drawings, in FIG. 1 is illustrated a multi-solid fluidized bed steam generating system 10 utilizing L-valve type flow control devices 12 for recycling fine solid particulate material 14 such as hot sand and the like from an external heat exchanger 16 back to a fluidized dense bed section 18 adjacent to a lower end portion of a vertically extending combustion vessel 20. The fluidized dense bed section 18 contains permanent, large-size, coarse solid particulate material 19 of a selected size range and the bed has a discrete upper level 21 so as to occupy only a limited space in the vessel overall. At the lower end, the combustion reactor vessel 20 includes a tapered end section 22 with a large drain valve 24 and companion pressure lock valve 24A, which valves are opened periodically in sequence to discharge agglomerated coarse size solid particulates of a size range greater than approximately 15,000 microns. These large agglomerates are not effectively fluidized in the dense bed 18 and fall out to collect in the conical end section 22 of the reactor vessel. The drain valve is opened from time to time to discharge the agglomates into an awaiting cart 25 for removal after cooling.

A primary source of combustion air and gaseous fluidizing medium is introduced at a level intermediate the frusto-conical section 22 and the lower end of the dense bed section 18 through a plurality of air injector conduits 26 interconnected by one or more supply headers 28 on opposite sides of the combustion vessel and supplied with primary fluidizing combustion air from a suitable source such as a large blower 30 indicated in schematic form in FIG. 1.

Primary air supplied under pressure from the blower 30 moves upwardly through the dense bed section 18 and fluidizes the permanently residing, relatively large size coarse solid particles 19 in the bed to continuously move around to efficiently transfer heat to the incoming primary combustion air. These coarse particles reside permanently in the dense bed section and do not circulate around the system as do the fine solid particles 14. Preferably, the coarse particles 19 have a size range of approximately 6000 microns to 15,000 microns and the particles may comprise material such as "River Gravel" having long term chemical and physical stability so as to be substantially non-agglomerative and resistant to substantial attribution as the elevated operating temperatures and high fluid velocity encountered in the dense bed section 18.

Fuel for combustion in the form of raw coal or crushed coal along with additives such as crushed limestone is introduced downwardly into the vessel 20 adjacent the upper level 21 of the dense bed section 18 via a sloping fuel inlet conduit 32. An intense combustion process takes place in the upper regions and immediately above the upper level of the dense bed section 18 and the fluid entrained recirculating multisolid fines 14 readily absorb the heat produced by combustion to maintain a controlled maximum temperature as the entrained fine solid particulate material moves upwardly from the dense bed towards the upper end of the combustion vessel 20.

The fluid entrained, recirculating solid fine particulate material 14 comprises a chemically and physically inert refractory material such as sand or fly ash which mixes with the burning and non-burned fuel particles and with particles of limestone which are chemically active. The fine solids are intimately mixed with the hot combustion gases and generally flow upwardly in the dense bed region 18 through a large expansion dust space found above the dense bed wherein further combustion and heat absorption by the fine solid particulate material takes place over a substantial height in the combustion vessel 20. The dust space is much greater in volume than the volume of the dense bed section 18 and extends from the upper level 21 of the dense bed to a dome-shaped top 34 at the upper end of the reactor vessel.

Additional secondary combustion air is introduced into the combustion reactor vessel 20 at a level spaced above the fuel injector conduit(s) 32 through a plurality of secondary air injector conduits 36 which are supplied from a manifold 38, in turn supplied with secondary air under pressure from a source such as a large blower or fan 40 shown schematically in FIG. 1. Additional heated gas and recycled fine material is supplied to the combustion vessel 20 at a level above the secondary air inlets 36 through an inlet conduit 42 connected to a fines collector hood 44 above the body or housing of the external heat exchanger 16.

The hot gaseous products of combustion along with the solid fine particulate material including inert fines and unburned or partially burned coal and limestone products pass upwardly to the upper end of the combustion vessel 20 and move through an outlet 46 into a tangentially directed inlet 48 of a cyclone or separator vessel 50 utilizing centrifugal force to separate out the solid fines 14 from the gaseous products so that the gases flow upwardly through an outlet 52 while the solids fall downwardly into a frusto-conical, lower cyclone section 54 having an outlet 54a at the lower end in communication with a hot chamber 56 of the external heat exchanger 16.

The hot gaseous products of combustion leaving the outlet 52 of the cyclone type centrifugal separator 50 flow through a hot gas duct 58 to enter the inlet side 60a of a gas heated convection tube boiler pass 60. The boiler tubes of the convection boiler pass are contained within an insulated housing 62 having an outlet 60b for cooled gas in communication with an exhaust gas duct 64 leading to an economizer, bag house filters, gas scrubbers or the like (not shown) before the cooled and cleansed gas is finally discharged into the atmosphere.

The convection tube boiler pass housing 62 contains a steam drum 66 at an upper level above the level of the gas outlet 60b and a bank of boiler tubes 68 extends downwardly from the steam drum to a mud drum 70 at a level below the gas outlet. Hot water from the mud drum flows down an inlet pipe 72 to a circulating pump 74 and is discharged from the pump through a pressure line 76 connected to a header system 78 of the external heat exchanger 16.

Additional heat is picked up by the hot water as it passes from the header system 78 through a heat exchanger coil 80 provided in a secondary (cooler) chamber 82 of the external heat exchanger 16. The chamber 82 is separated from the hot chamber 56 by a dam 84 and some of the fluidized fines returned to the hot chamber from the outlet 54 of the cyclone 50 flow over the dam into the cooler chamber to give up heat to the water flowing through the coil 80.

After passing through the coil 80, the hot water and-/or steam flows upwardly to a collection header system 86 at an upper level of the external heat exchanger 16, and then flows through a conduit 88 connected to a lower header system 90 at a lower level in the convection pass housing 62. The heated water/steam then flows upwardly through risers 92 to an upper steam header 94 and from the steam header 94 to the steam drum 66 through a steam line 96.

Superheated steam is provided by a superheater tube bank 98 positioned adjacent the hot gas inlet side of the housing 62 and steam is supplied to the superheater coil 98 via a conduit 100 from the steam drum as illustrated. Superheated steam generated in the superheater coil 98 passes upwardly to a collection header 102 and out of the housing for use through a superheated steam output line or conduit 104.

The recirculating hot fine solid particulate materials 14 separated from the hot gaseous products of combustion in the centrifugal cyclone separator 50 flow downwardly to the hot chamber 56 of the external heat exchanger 16 and in the hot chamber fluidizing air is supplied to fluidize the fine solids via air injectors 106 supplied by inlet headers 108 extending along the lower level of the hot chamber. The headers are supplied with fluidizing air from a suitable source such as a blower 110 through a air duct inlet 112.

Some of the particles of fine solid particulate material pass directly downwardly from the lower end of the hot chamber 56 into the upper, L-valve flow control device 12 for recirculation back into the dense bed section 18 of the combustion vessel 20. A portion of the hot solid particulate material reaching the hot chamber 56 however, flows over the dam 84 into the cooler recycle chamber 82 to give up heat to the coil 80. This solid material is cooled by giving up heat to the water/steam in the coil 80 and eventually flows downwardly toward a discharge hopper 114 below the main body of the external heat exchanger. The hopper has a lower outlet end in communication with a lower L-valve flow control device 12 to supply cooled solid particulate material thereto for recycling into the dense bed section 18 of the combustion level 20 at a lower level in the bed. The hot fine solid particulate material reaching the cool chamber 82 around the coil 80 is maintained in a fluidized state by a plurality of air injectors 106 provided in an array adjacent a bottom level of the chamber and these headers are also supplied with a source of pressurized air from the conduit 112 and blower 110. Some of the solid fine particles are carried upwardly by the fluidizing gas into the hood 44 and are recycled directly back into the combustion vessel 20 through the inlet 42 at an upper level above the dense bed section 18.

Each L-valve flow control devices 12 is adapted to provide an adjustably controllable flow and valve action for recycling fine solid particulate material 14 that is discharged from either chamber of the external heat exchanger 16 back into the dense bed section 18 of the combustion vessel 20. The L-valves include an elongated, hollow, tubular, generally horizontally extending conduit or feeder leg 116 having an outlet end in communication with the interior of the combustion vessel 20 so that fine solid particulate material 14 will be injected into the fluidized dense bed material 18 at a level intermediate the upper and lower surface of the dense bed section.

Each L-valve feeder conduit 116 also includes an outer or receiving end spaced outwardly remote from the vessel 20 in communication with an upstanding, generally vertically extending standpipe leg 118. The upstanding legs 118 of the respective L-valves 12 are in communication with the discharge outlet of the hot recycle chamber 56 of the external heat exchanger 16 and with the outlet at the lower end of the cooler recycle chamber 86 and discharge hopper 114 as shown in FIG. 1. The solid fine material received in the upstanding legs 118 of the L-valves 12 accumulates in an upwardly extending column to form a head of material providing a pressure seal between the receiving end of the standpipe leg 118 and the outlet or discharge end of the horizontal feeder leg 116. Accordingly, the operating pressure of the dense bed section 18 in the combustion vessel 20 is not dependent on the operating pressure which is obtained in the external heat exchanger 16 so as to adversely effect the operating characteristics of either of these components. The head of fine solid particulate material 14 in the vertical standpipe legs 118 also provides a continuous downward bias or head tending to direct the material dowards toward the receiving end of the horizontal feeder conduits 116 when recycle flow commences.

Figure 4:
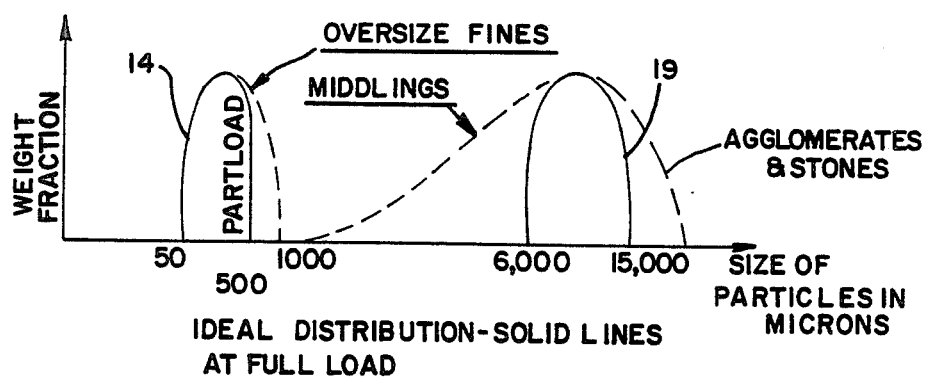
FIG. 4 is a graphical representation of the ideal size distribution pattern of the fine and coarse solid particulate materials used in accordance with the principles of the present invention.

Referring to FIG. 4, therein is a graphical illustration of an ideal particle size distribution for full load operating conditions of the multi-solid fluidized bed system 10. Ideally, the recirculating fine solid particulate material 14 should range in size between approximately 50 to 500 microns and the larger coarse solid particulate material 19 preferably should range from approximately 6000 to 15,000 microns in size. As indicated by the dotted line marked oversize fines, these fines should be eliminated when less than design loads are utilized in the heat generation system. The amount of fluidizing air and combustion air supplied is reduced or modulated accordingly in order to avoid high stack losses and the development of higher percentages of NOx, both due to high excess air at reduced loads. In the partial load range it is desirable to remove some of the recirculating solid fine particles 14 above the size range of approximately 500 to 600 microns because at reduced velocities when the airflow is modulated downwardly, particles in size from 500 to 600 microns up to about 1000 tend to segregate out and remain stratified in the dense bed section 18. When these particles do remain or stratify in the dense bed 18 because of the reduced velocity, the effective pressure drop across the dense bed is greatly increased and increased power consumption is needed, thus making the process relatively inefficient at low loads.

Figure 2:
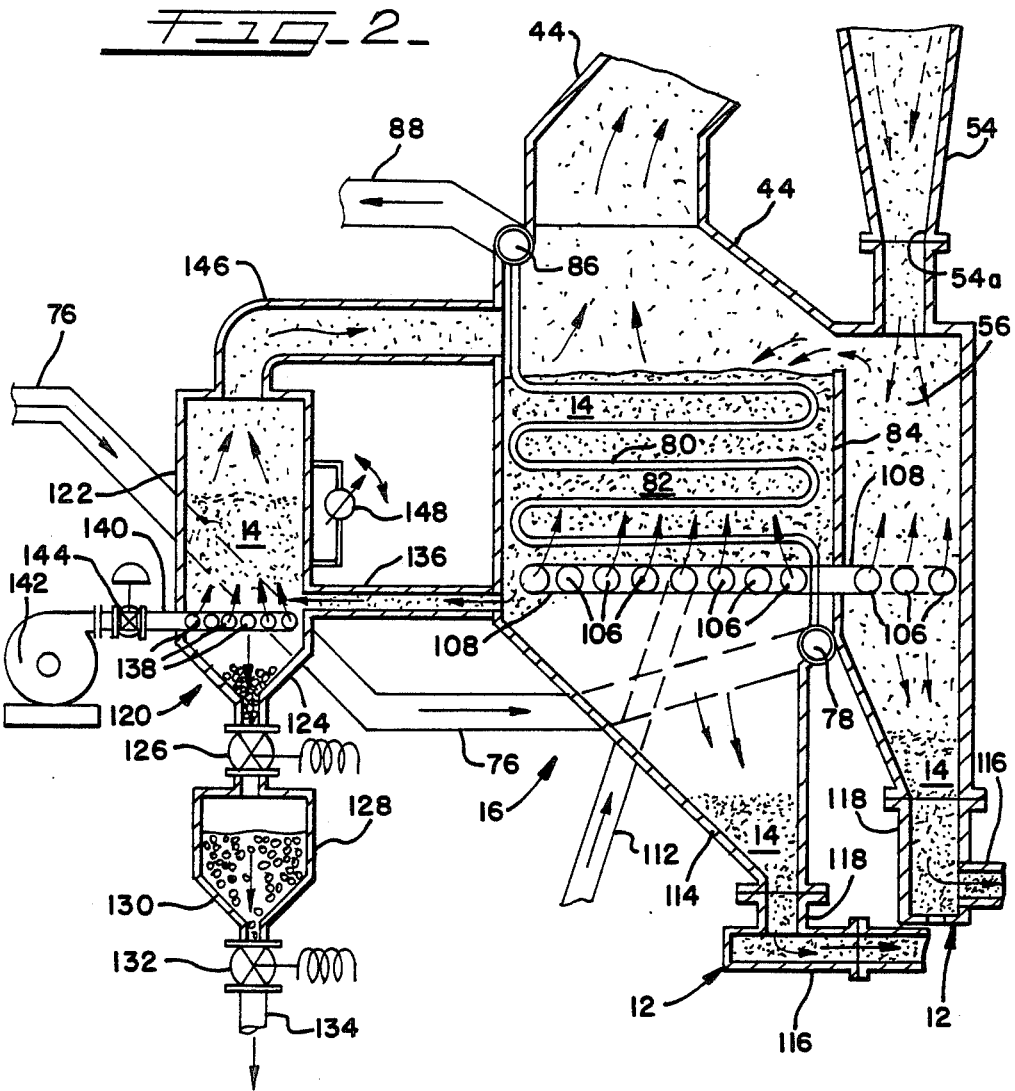
FIG. 2 is an enlarged fragmentary vertical cross-sectional view of a solid particle separator associated with an external heat exchanger in the system for removing unwanted solid particulate material.

In accordance with the present invention a separator system 120 (FIG. 2) is provided for removing recirculating fine solid particles 14, having a particle size range of approximately 500 to 1000 microns. This action eliminates the segregation or stratification of these particles in the dense bed section 18 when the system is operated at lower than design loads. The separator system 120 includes a housing 122 having a conically-shaped bottom 124 with an outlet at the lower end in communication with a control valve 126. When the control valve 126 is opened, accumulated fine particles of 500 micron size and larger that have been collecting in the lower conical end portion 124 are passed downwardly into a lower, airlock hopper 128 having a conically-shaped lower end portion 130 in communication with a second control valve 132. When the control valve 132 is opened, the material collected in the pressure lock compartment 130 is discharged downwardly through a discharge conduit 134 into an awaiting cart 135 for eventual waste disposal.

Recirculating fine solid particulate material 14 from a lower level of the chamber 82 of the external heat exchanger 16 is directed into the lower portion of the upper housing 122 of the separator through a line 136 having an inlet in communication with the cool chamber 82 of the external heat exchanger at a level adjacent the level of the air injectors 106 therein. The opposite end of the supply conduit 136 is positioned to direct a flow of solid fine particulate material into the main body of the housing 122 of the separator at a level slightly above the level of a plurality of fluid injector pipes 138 supplied from a manifold 140 connected to a source of pressurized air or gas such as a blower or compressor 142.

A modulating control valve 144 is provided in the supply manifold 140 leading from the blower to the air injectors 138 so that the amount of fluidizing air can be precisely and accurately controlled to fluidize the relatively shallow bed of material in the housing 122 of the separator. At fluid velocities approximating 10 to 12 feet per second, particles of 500 micron size and larger tend to stay in fluidized condition in the bed within the housing 122 while particles of a size less than 500 microns are elutriated by the gaseous fluid flow and pass upwardly from the upper level of the bed towards the upper end of a compartment or housing 122. A return duct 146 is connected between the upper end of the separator housing 122 and the hood 44 above the bed in external heat exchanger 16 so that the fine solid particulate material of a particle size range less than 500 microns is returned for recycling into the combustion vessel 20 through the inlet opening 42. The particles greater than 500 microns in size contained in the separator housing 122 gradually become defluidized and fall out to collect in the conically shaped lower end section 124.

The bed of fluidized material in the separator housing 122 of the separator 120 is operated at a relatively high velocity and shallow bed height in comparison to the relatively deep, low velocity bed contained in the hot and cold chambers 56 and 82 of the external heat exchanger 16. This arrangement brings the pressures into balance and as a pressure drop begins to build up in the separator bed of the chamber 122 due to a large depth accumulation of particles, the upper control valve 126 opens for a timed interval to discharge the large size particles downwardly into the airlock chamber 128. At the end of this timed interval, the control valve 126 is returned to a closed position and the lower control valve 132 is opened to discharge material from the lower conical section 130 of the airlock chamber into the refuse cart 135. This type of valve operation permits a discharge of material from a chamber at one operating pressure region to a chamber at another operating pressure in a controlled manner.

The timing interval for operating the respective control valves 126 and 132 is preferably controlled by an electronic level indicator instrument 148 which senses the level of material accumulating in the body 122 of the separator 120 above the air injectors 138. When a particular high set level is reached the valve 126 is opened for discharge and when the discharging material lowers the level down to a low set point the valve 126 is energized to close. Subsequently, the valve 132 is opened for a time period so that all of the material collected in the airlock chamber 128 will be discharged and then the valve 132 is closed and the cycling operation continues.

While the steam generating system 10 is in operation, the separator 120 operates to effectively remove from the recirculating fine material 14 all or most of the unwanted solid particles having a size range greater than approximately 500 to 600 microns in size. The separator reduces and eliminates the problem of particle segregation in the dense bed section 18 of the reactor vessel 20 by effectively removing from the recirculation path, most of the heavier, larger size particles in a size range of approximately 500 to 1000 microns so that the remaining fine solid particles of smaller size may freely pass through the dense bed section to effect an efficient heat transfer, even at lower than normal or design load air flows.

Figure 3:
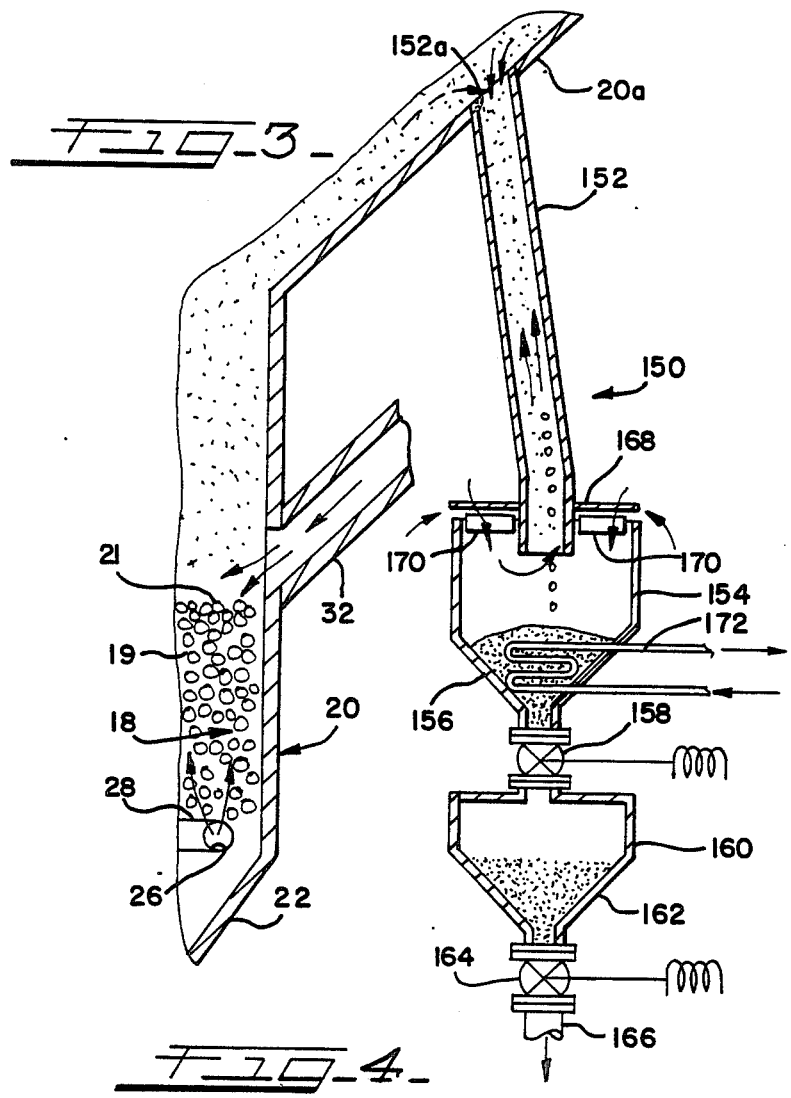
FIG. 3 is a fragmentary vertical cross-sectional view of a separating device for removing unwanted particulate materials from the combustion reactor vessel.

Referring now to FIG. 3, in order to remove a middling range of solid particulate materials which are too small in size and surface area to act as an effective fluidized bed material 19 in the dense bed section 18, and which middling size particles tend to drop out of entrainment or fall out of suspension so as not to readily recirculate with the smaller, fine solid particulate material, the fluidized bed system 10 is provided with a separator 150 which is designed and is effective to remove particles having an approximate size range of 1000 microns to 6000 microns, which is a middling size range between the preferred size ranges of the fine particles 14 and the coarse dense bed particles 19. Some of the middling material is formed by the fragmentation of the coarse dense bed material 19 and tends to fall out of suspension at certain regions in the reactor vessel 20, as for example in the region where the effective flow cross-section is increased at a tapered segment 20a (FIGS. 1 and 3) adjacent the region of the introduction of secondary air through the inlets 36. Middling sized material gravitating out of the general upward flow in this region is collected in one or more drop tubes 152 having an open upper end 152a defined in the tapered wall section 20a. In practice the drop tubes may range from 10 to 20 feet in length and an upper portion forms a separating region wherein the heavier, larger size particles in a size range of 1000 to 6000 microns gravitate out and drop away from the lighter particles which eventually move upwardly and back out into the main flow of entrained solid fine particles in the upper portion of the reactor vessel.

As the heavier particles move down to the lower half of the relatively long drop tubes, the particles are cooled and fall into a collection chamber 154 having a frusto-conically shaped lower end section 156 defining an outlet at the lower end connected to an upper control valve 158. When the valve is opened, material collected in the chamber 154 is discharged downwardly into a pressure lock chamber 160 having a frusto-conical lower end portion 162 connected to a discharge valve 164. A discharge chute 166 from the valve 164 is provided to direct waste material into an awaiting cart 167 for eventual disposal when the valve is opened.

The separator system 150 is generally similar in operation to the separator 120 and if desired, a level sensor like the sensor 148 may be provided to control timed operating cycles of the respective upper and lower control valves 158 and 164. Because the enlarging tapered section 20a of the upstanding reactor vessel normally has an internal operating pressure less than atmospheric, fluidizing air for movement upwardly in the drop tube 152 is supplied from the atmosphere and is controlled by an adjustable annular top plate 168 and/or additional vanes 170. These vanes which are angularly adjustable may be provided to closely regulate the flow rate of incoming air which moves into the upper end of the chamber 154 prior to moving upwardly in the drop tube 152 towards the separation zone adjacent the outlet or upper end 152a. In the event the operating pressure in the vessel 20 adjacent the upper open end 152a exceeds atmospheric a positive pressure fluid injector system as provided for the separator 120 may be utilized.

In general, the middling size material falling downwardly in the drop tube 152 and collecting in the chamber 154 and conical end section 156 thereof is at an elevated temperature because of the combustion process taking place within the vessel 20 and accordingly, a water or steam coil 172 is provided to cool the material while absorbing useful heat energy therefrom before discharge of the material downwardly into the pressure lock chamber 160.

The separator system 150 thus provides an effective, low energy cost, operating system for separating out middling size particulates in the range of approximately 1000 to 6000 microns. The problems of attrition heretofore experienced in fluidized bed systems is greatly reduced because these less-efficient middling size particles are removed from the process and thereby the overall operating efficiency of the larger, coarse size solid particulate materials 19 in the fluidized bed 18 is improved. As previously indicated, agglomerated particles in the dense bed 18 that reach sizes above the 15,000 micron range tend to gravitate downwardly into the lower frusto-conical section 22 of the vessel 20 and these particles are removed or discharged from time to time by periodic opening of the valve 24.

The steam generating system 10 comprises an efficiently operating steam generator employing a fluidized bed in a most efficient manner wherein the fine solid particulate materials are maintained within a selected particle size range to recirculate through components of the system including the dense bed section 18, which contains coarse size solid particulate materials, also maintained in a desirable particle size range. The result is a highly efficient system overall wherein the load or output may be modulated for loads less than the design load and yet high efficiency heretofore not achieved in prior art systems is obtained.

Although the present invention has been described in terms of a preferred embodiment, it is intended to include those equivalent structures, some of which may be apparent upon reading this description, and others that may be obvious after study and review.

What is claimed and sought to be secured by Letters Patent of the United States is:

1. In a heat generating system including a combustion vessel having a fluidized bed containing large size solid particles normally permanently residing therein for providing a dense, multi-size solids fluidized bed section and including recirculating solid particles of smaller size moving through said dense bed section, a source of fluidizing and combustion gas introduced into said vessel and discharged therefrom along with said recirculating smaller solid particles and a fuel injector for supplying fuel for combustion to generate heat absorbed by said solid particles in said vessel; the improvement comprising, first separator means for removing said recirculating smaller size solid particles of a selected upper size range thereby preventing segregation of said upper size range particles in said dense bed section when a reduced flow rate of fluidizing gas is moving through said dense bed section at a reduced combustion load, said large size particles of said dense bed section comprising particles having a size range of approximately 6000 microns to 15,000 microns and said recirculating smaller size particles having a size range of approximately 50 microns to 500 microns, and wherein said first separator means is positioned remotely of said combustion vessel and includes means for removing solid particles haivng a size range of approximately 500 miorons to 1000 microns from said recirculating smaller size particles to be recycled back to said dense bed section of said combustion vessel.

2. The heat generating system of claim 1; including, second separator means for removing solid particles from said vessel of an intermediate size range between said selected upper size range of recirculating solids and said large size solid particles of said dense bed section.

3. The heat generating system of claim 1, including drain means in said vessel below said dense bed section for removing extra large size solid particulates agglomerating and dropping out of said dense bed section.

4. The heat generating system of claim 1, wherein said first separator means includes a housing for controlling a bed of said recirculating smaller size solid particles, gas injector means in said bed for entraining and carrying away from said bed solid particles of a size smaller than approximately 500 microns, and a collector below said bed for collecting solid particles of a size greater than approximately 500 microns.

5. The heat generating system of claim 4, wherein said collector is provided with a valve operable to discharge said collected solid particles and closeable for accumulating the same, and a pressure lock hopper in communication with said valve for receiving the discharge therefrom when said valve is open, and sealed from said collector when said valve is closed.

6. The heat generating system of claim 1, including:

a heat exchanger externally of said combustion vessel for extracting heat from said recirculating smaller size solid particles before recycling thereof back to said combustion vessel, said heat exchanger including a chamber for containing a volume of said solid particles, a tubular heat exchange coil mounted in chamber for external contact with said volume of said solid particles for extracting heat therefrom, thereby transfer to a fluid passing internally of said coil, gas injector means for fluidizintg said volume of solid particles in said chamber;

inductor means for directing solid particles from a lower level of said heat changer chamber to said first separator means, and return means for directing fluidized solid particles having a size less than approximately 500 microns back to said chamber for recylcling to said combustion vessel.

7. The heat generating system of claim 2, wherein;

said second separator means includes an elongated drop tube in communication with said vessel at an upper end at a level above said dense bed section for receiving intermediate size range particles from said vessel, collector means adjacent a lower end of said drop tube for holding a quantity of said intermediate size range particles falling downwardly through said tube, means for regulating the flow of outside air into said lower end of said drop tube to control the upwardly velocity therein to carry solid particles of a size less than said intermediate size range back upwardly into said vessel.

8. The heat generating system of claim 7, including:

particle cooling means in said collector means for reducing the temperature of collected intermediate size range particles therein, and drain means for discharging said collected intermediate size range particles from said collector means.

9. In a method of operating a fluidized bed heat generating system which comprises;

forming an entrained fluidized bed in a combustion vessel containing a first, relatively fine, solid particle component and forming in a more limited space region partially within said vessel a dense fluidized bed containing a second relatively coarse solid particle component, both the first and second component particles essentially comprising material having long-term physical and chemical stability in the fluidized bed system, providing a recirculation path for the first particle component to and from the vessel through the dense fluidized bed in the more limited space region, operating the fluidized bed system at a velocity such that the second component particles are effectively retained in a fluidized state in the dense fluidized bed in the more limited space region, while the first component particles are recirculated around the system recirculation path and interpenetrate to move through the second component particles in the dense fluidized bed;

the improvement comprising:

removing a portion of said solid particles from said system having a particle size less than that of said second coarse solid particle component but so large in size that said portion of solid particles are not readily entrained out of said dense fluidized bed at said operating velocity of said sytstem.

10. In a method of operating a fluidized bed heat generating system which comprises;

forming an entrained fluidzied bed in a combustion vessel containing a first relatively fine solid particle component and forming in a more limited space region partially within said vessel a dense fluidized bed containing a second relatively coarse solid particle component, both the first and second component particles essentially comprising material having long-term physical and chemical stability in the fluidized bed system, providing a recirculation path for the first particle component to and from the vessel through the dense fluidized bed in the more limit space region, operating the fluidized bed system at a velocity such that the second component particles are effective by retained in a fluidized state in the dense fluidized bed in the more limited space region, while the first component particles are recirculated around said path moving into and out of said dense fluidized bed of said second component particles;

the improvement comprising:

removing a portion of said solid particles of a size intermediate that of said first and second particle components, and removing a second portion of said recirculating, first, relatively fine, solid bed particle component having a particle size such that they are not readily entrained out of said dense fluidized bed at said operating velocity of said system.

11. The method of claim 9, wherein: said recirculating, first relatively fine solid bed particles comprise a size range of approximately 50 microns to 1000 mcirons and said second relatively coarse solid bed particles comprise a size range of approximately 6000 microns to 15,000 microns.

12. The method of claim 11, wherein;

said removed portion comprises particles having a size range of approximately 500 microns to 1000 microns.

13. The method of claim 12, including the step of;

removing any recirculating solid bed particles from said recirculating path having a particle size range of approximately 500 microns to 6000 microns.

14. The method of claim 11, including the step of:

removing solid bed particles from said vessel having a particle size greater than approximately 15,000 microns.

15. The method of claim 10, wherein;

said portion of particles removed range in particle size between approximately 500 microns and 6000 microns.

16. The method of claim 10, including the step of;

removing a portion of said second, relatively coarse, solid bed particle component having a particle size of greater than approximately 15,000 microns.

17. The method of claim 10, wherein;

said portion of particles removed range in particle size from approximately 500 microns to 1000 microns.

18. The method of claim 10, wherein;

said second portion of said recirculating solid bed particles have an approximate particle size range of 50 microns to 1000 microns.

19. A fluidized bed system, comprising;
a reactor vessel for containing a recirculating flow of fluid entrained, fine solid particulate material and a dense bed section of limited space in said vessel containing fluidized coarse solid particle material retained in said limited space,
means defining a recirculating path for said fine solid particulate material externally of said vessel to flow into and out of the vessel and through said coarse material of said dense bed section including a heat exchanger externally of said reactor vessel receiving a flow of said fine solid material for recycle back to said reactor vessel after heat is removed therefrom,
means for fluidizing said coarse solid material in said dense bed section and for fluid entraining said fine solid material to flow through said dense bed section and around said recirculating path, and
means for maintaining said fine solid particulate material in a selected particle size range including a separator receiving fine solid material from said heat exchanger and including a fluid injector for fluid entraining particles of a maximum size range for recycle back to said reactor vessel while collecting for discharge from the system particles too large in size to be entrained for recycle.

20. A fluidized bed system, comprising;
a reactor vessel for containing a recirculating flow of fluid entrained, fine solid particulate material and a dense bed section of limited space in said vessel containing fluidized coarse solid particle material retained in said limited space,
means defining a recirculating bath for said fine solid particulate material externally of said vessel to flow into and out of the vessel and through said coarse material of said dense bed section,
means for fluidizing said coarse solid material in said dense bed section and for fluid entraining said fine solid material to flow through said dense bed section and around said recirculating path,
means for maintaining said coarse solid particulate material in a selected particle size range, and
means for separating coarse solid particulate material from said coarse solid particulate material in said dense bed having a particle size greater than said selected particle size range.

21. The fluidized bed system of claim 19, wherein said means for maintaining said selected particle size range includes separator means in communication with said reactor vessel away from said dense bed section for collecting solid particulate material in a size range greater than said selected range and less than the particulate size of said coarse solid material in said dense bed section.

* * * * *